United States Patent [19]

Landgarten et al.

[11] Patent Number: 4,862,506

[45] Date of Patent: Aug. 29, 1989

[54] MONITORING, TESTING AND OPERATOR CONTROLLING OF ACTIVE NOISE AND VIBRATION CANCELLATION SYSTEMS

[75] Inventors: Harris B. Landgarten, Douglaston, N.Y.; Eldon W. Ziegler, Columbia, Md.

[73] Assignee: Noise Cancellation Technologies, Inc., Columbia, Md.

[21] Appl. No.: 159,908

[22] Filed: Feb. 24, 1988

[51] Int. Cl.[4] ............... H03B 29/00; H04B 15/00
[52] U.S. Cl. ........................... 381/71; 381/94
[58] Field of Search ............ 381/71, 93, 94, 103, 381/96, 73.1; 324/77 B; 364/485

[56] References Cited

U.S. PATENT DOCUMENTS

| | | | |
|---|---|---|---|
| 4,490,841 | 12/1984 | Chaplin et al. | 381/71 |
| 4,501,014 | 2/1985 | Blüthgen | 381/94 |
| 4,566,118 | 1/1986 | Chaplin et al. | 381/94 |
| 4,611,343 | 9/1986 | Rapaich | 381/103 |
| 4,685,065 | 8/1987 | Braun et al. | 364/485 |
| 4,689,821 | 8/1987 | Salikuddin et al. | 381/71 |
| 4,715,559 | 12/1987 | Fuller | 381/71 |

FOREIGN PATENT DOCUMENTS 2069280  8/1981  United Kingdom ............. 381/71

Primary Examiner—Jin F. Ng
Assistant Examiner—David H. Kim
Attorney, Agent, or Firm—Barnes & Thornburg

[57] ABSTRACT

A monitoring capability may be provided integral with or separate from a vibration cancellation system to monitor or display input and output signals and transfer functions as well as spectral waveforms. Testing is performed by monitoring and displaying the input and generating appropriate test signals while further monitoring and displaying the input. The ability to modify the characteristics of the vibration cancellation system is included.

35 Claims, 5 Drawing Sheets

```
        Input           Output    Response
Ch   Gain   Peak        Peak      Ratio
1M   18.1   1.7         -80.0     8.42
 2   42.1  -40.6L       -80.0     0.00
```

```
              GROUP A
SAMPLE TIME      .017
SAMPLE RATE     7739
FREQ. UNIT       60.5
RPM MULT        1.000
RPM             3628
START RPM        300
```

```
        Channel 1
Manual
Averaging         2
F  low           50
F  hi           400
Max out          4.8
Min input      -50.0
Test type         1
Ref level       -40
```

| CH 1 | | | |------TF------| | | |
|---|---|---|---|---|---|---|
| FREQ | INPUT | OUTPUT | MAG | PHASE | COH | CENTER FREQ |
| 12.1 | 8 | 0 | 0.00 | 0.0 | 0.00 | 16.0 |
| 24.2 | 6 | 0 | 0.00 | 0.0 | 0.00 | 24.0 |
| 36.3 | 14 | 0 | 0.00 | 0.0 | 0.00 | 40.0 |
| 48.4 | 31 | 110 | 0.37 | -3.6 | 1.00 | 48.0 |
| 60.5 | 58 | 968 | 0.60 | -38.4 | 0.99 | 64.0 |
| 72.6 | 66 | 839 | 1.04 | -57.9 | 1.00 | 72.0 |
| 84.7 | 14 | 730 | 1.62 | -85.0 | 1.00 | 88.0 |
| 96.8 | 10 | 644 | 2.31 | -114.4 | 1.00 | 96.0 |
| 108.9 | 11 | 570 | 2.93 | -143.5 | 1.00 | 112.0 |
| 121.0 | 2 | 515 | 3.60 | -169.8 | 1.00 | 120.0 |
| 133.1 | 73 | 418 | 3.73 | 163.6 | 1.00 | 136.0 |
| 145.2 | 18 | 319 | 4.17 | 145.3 | 1.00 | 144.0 |
| 157.3 | 35 | 194 | 5.03 | 119.4 | 0.99 | 160.0 |
| 169.4 | 48 | 107 | 5.07 | 102.8 | 0.98 | 168.0 |
| 181.5 | 20 | 60 | 6.09 | 79.8 | 0.98 | 184.0 |
| 193.6 | 128 | 27 | 5.79 | 63.7 | 0.91 | 192.0 |
| 205.7 | 100 | 25 | 6.16 | 39.7 | 0.91 | 208.0 |
| 217.8 | 37 | 14 | 5.92 | 14.0 | 0.96 | 216.0 |
| 229.9 | 50 | 16 | 6.56 | -2.8 | 1.00 | 232.0 |
| 242.0 | 24 | 8 | 5.11 | -31.2 | 0.89 | 240.0 |

FIG 6

MONITORING, TESTING AND OPERATOR CONTROLLING OF ACTIVE NOISE AND VIBRATION CANCELLATION SYSTEMS

BACKGROUND AND SUMMARY OF THE INVENTION

The present invention relates generally to vibration cancellation and more specifically to monitoring and testing and operator controlling of vibration cancellation systems.

Primary vibrations in gas liquid or solids have been cancelled or nullified, at least in part, with specially generated cancelling or secondary vibrations. For example, the prior art device shown U.S. Pat. No. 4,490,841 to Chaplin et al., specifically shows a method and apparatus for cancelling vibrations wherein a vibration sensor is connected through an input circuit and fourier transformer to a processor which produces an output through a fourier transformer and output circuit to a vibration actuator. A synchronous input is also provided to the processor from the vibration source. Although no adjustment, testing or monitoring is described in the aforementioned patent, a minimum amount of adjustment is available and includes generally the frequency bandwidth of the frequencies which the system is capable of handling, the gain of the amplifiers, and other types of adjustments. The only measure of the inability of the system to handle the particular environment is that the vibrations have not been effectively cancelled.

An automatic digital audio processor (ADAP) has been produced by Rockwell International, and is specifically described in an article by James E. Paul, "Adaptive Digital Techniques for Audio and Noise Cancellation", *IEEE Circuits and Systems Magazine,* Volume 1, No. 4, pp. 2-7. The ADAP specifically displays the convergence time, the sample time, the filter order and the input delay. These parameters, as well as bandwidth may be adjusted on this system. Neither an integral testor nor the display of many of the signals within the circuitry are provided in this article.

The prior art has failed to take advantage of the signals available within the electronics to provide monitoring of the operation of the circuitry as well as an indication of the operation of system in which the vibrations are being cancelled. If one can monitor these signals, they can determine whether the vibrations produced are normal, or if the vibrations indicate a serious failure of the system.

Thus, it is an object of the present invention to provide a monitoring system for a vibration cancellation system.

Another object of the present invention is to provide the capability to determine whether the systems whose vibrations are to be cancelled is operating in a safe range.

A further object of the present invention is to provide a monitoring system and display which may be integral with or separate from a vibration cancellation system.

A still further object of the present invention is to provide a display and input device for varying the operating parameters of the vibration cancellation system.

A still even further object of the present invention is to provide an integral testor for vibration cancellation systems which test the individual elements of the circuitry as well as their response.

These and other objects are obtained by providing a display for displaying one or more of the following: the input vibration signal received from the vibration system; the transfer function of the cancellation system; and the output vibration cancellation signal. The input circuit generates an input waveform from the input signals and provides an input spectral waveform to the transfer function generator. The transfer function generator provides an output spectral waveform which is converted by the output circuitry to a vibration cancellation actuator signal. The display displays the input signal waveform, the input spectral waveform, the transfer function, the output spectral waveform and the vibration cancellation actuator signal. The input and output circuits each include a peak detector and the display displays the peak of the respective input and output signals. The gain of the input circuit is self-adjusting and the display also displays the input gain. The average magnitude of the transfer function and the spectral waveform of the transfer function are also displayed.

Circuitry is also provided for the synchronization signal received by the vibration cancellation system to determine certain parameters and display them. A rate detector and period detector respectively detect a sample rate and sample period from the synchronization signal. The display displays the detected sample rate and sample period.

In the embodiment wherein the monitoring and display system is separate and distinct from the vibration cancellation system, the monitoring and display system receives the input and output vibration signals and the synchronization signals from the vibration cancellation system. In addition to displaying the input vibration signal and the output vibration cancellation signal, the monitoring and display system would also calculate the transfer function of the cancellation system as well as deriving the appropriate input and output spectral displays. Similarly, the synchronization data would also be determined within the monitoring and display system. It should also be noted that the operator control of the parameters of the vibration cancellation system and the test would not be included in the monitoring display system which is not integral with the vibration control system. In the case of the stand-alone monitor it should be noted that the tester may be part of the stand-alone monitor and the only element not provided is the display of operator controllable inputs and parameters.

An input device is provided for setting a maximum output signal level and minimum input signal thresholds and the display displays these values. The input device may also input the highest and lowest frequency or bandwidth of the signals to be processed and the display displays these two values. The zero reference value for the spectral waveform for the display may also be set and displayed. The system receives synchronization signals and displays a sample rate and revolutions per minute of the synchronization signal. The input device may provide input for the minimum revolutions per minute for which the transfer function will operate which is also displayed. Circuitry is provided to convert the input vibration signal, transfer function and output vibration signals from vibration cancellation format to display format. The display may be in a common housing with the input, output and transfer circuitry or may be separate therefrom and connected by a communication link.

The testing circuitry integral with the vibration cancellation and monitor system includes five testing modes. The first testing mode produces an output pulse and determines the frequency at which the maximum input occurs in response to the output pulse and then provides a single tone output pulse at that frequency. The second mode produces a single tone output signal at the frequency of the lowest frequency of the input signal which is preset. The third mode produces a variable harmonic pulsating output signal. The fourth mode delivers the input signal to the output circuitry bypassing the transfer circuit. The fifth testing mode disables the output circuitry. During all the test modes, the input signals and spectrum are displayed.

It should be noted that throughout the specification and claims the use of the word "circuitry" is considered generic, and are defined so as to include not only electronic elements to perform the functions described, but also processors with software capable of performing these functions. For example, the functions of the input, transfer and output circuitry could all be performed in software. Thus, the term "circuitry" is not to be considered limiting.

Other objects, advantages and novel features of the present invention will become apparent from the following detailed description of the invention when considered in conjunction with the accompanying drawings.

BRIEF DESCRIPTION OF THE DRAWINGS

FIG. 6 is an illustration of a display of spectral information.

DETAILED DESCRIPTION OF THE DRAWINGS

Figures 1, 3, 4, 5:
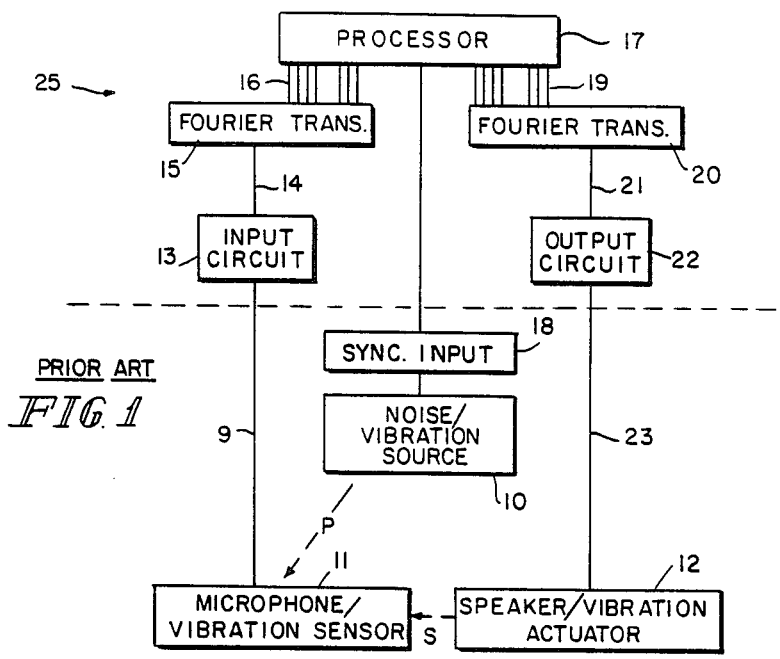
FIG. 1 is a schematic block diagram of a vibration cancellation system of the prior art.
FIG. 3 is an illustration of a display of input and output information.
FIG. 4 is an illustration of a display of group information.
FIG. 5 is an illustration of a display of channel parameters.

A vibration cancellation system 25 is illustrated in FIG. 1 including a microphone or vibration sensor 11 to sense the primary vibration P from vibration source 10 and a speaker or vibration actuator 12 which is actuated by the vibration cancellation system 25 to produce a secondary vibration S which interacts with the primary vibration P in the location of the vibration sensor 11.

The vibration cancellation system 25 includes an input circuit 13 connected to the vibration sensor 11 to receive signals therefrom and produce on line 14 an analog input waveform. A fourier transformer 15 receives the analog input signals 14 and provides a spectral waveform of the input sensed vibration on a plurality of outputs 16 to a processor 17. The processor 17, besides receiving the spectral vibration input signals on line 16, also receives a synchronization input from a synchronization source 18 which monitors the cycle of the vibration source 10. The processor 17, being a transfer means having a transfer function, receives a frequency domain components with respect to time from the fourier transformer 15, multiplies it by a multiplying coefficient, and produces a frequency domain coefficient on outputs 19.

The fourier transformer 20, being part of the output circuitry, receives the spectral waveform over outputs 19 from the processor 17 and produces an analog output signal 21 to the output drive circuit 22 which provides a cancellation signal to the actuator 12.

The details of the circuitry, their operations and examples of the transfer functions are described in the previously mentioned U.S. Pat. No. 4,490,841. To this extent, this patent is incorporated herein by reference. Although this patent is the vibration cancellation system used in the present example, the monitoring and testing system of the present application may be used with other vibration cancellation systems. For example, it may be used with other Chaplin et al. systems described in U.S. Pat. Nos. 4,153,815; 4,417,098; and 4,566,118, as well as systems described in U.S. Pat. Nos. 4,677,676 and 4,627,677.

Figure 2:
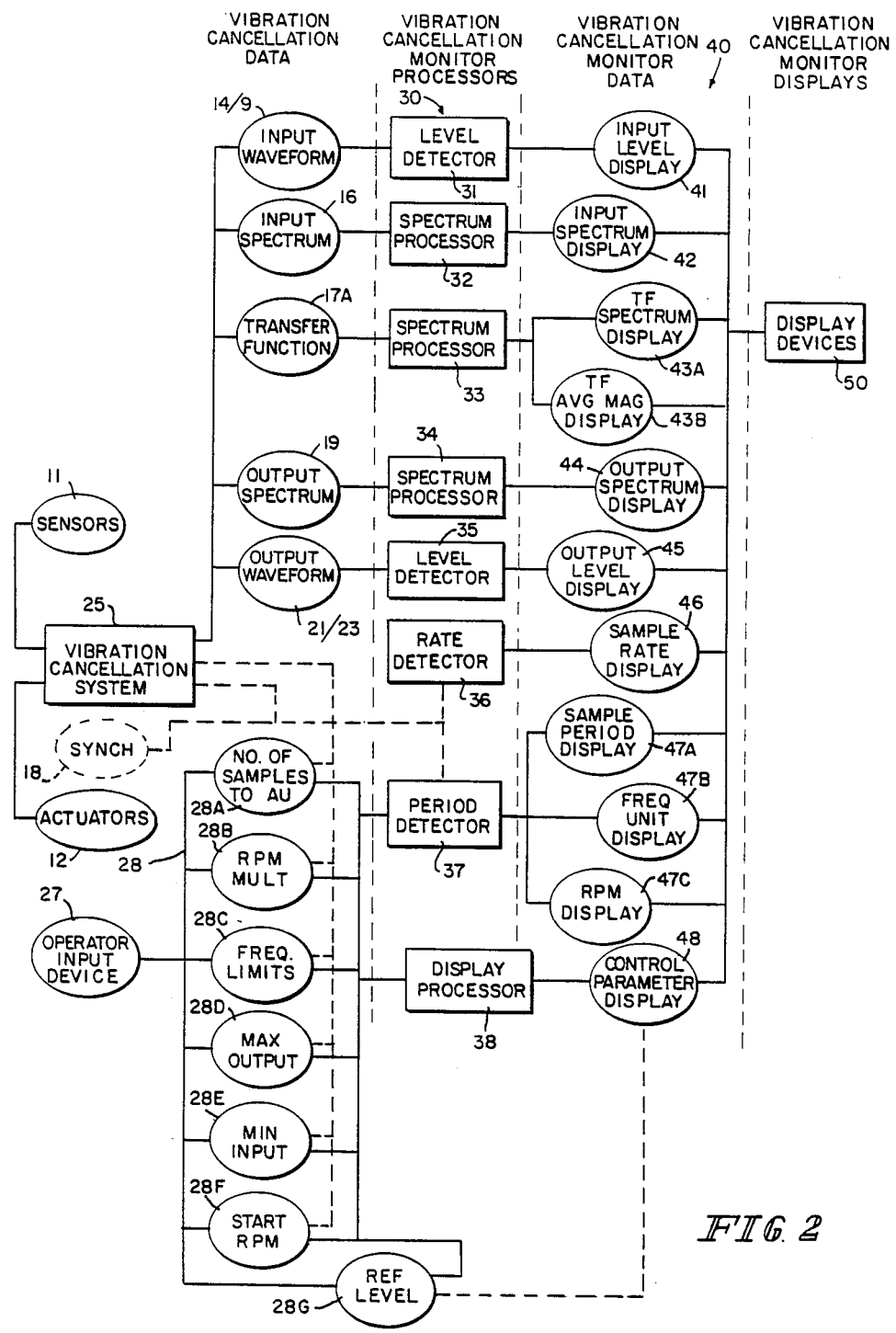
FIG. 2 is a schematic block diagram of a vibration cancellation and monitoring system according to the principles of the present invention.

The modification of the circuit of FIG. 1 to provide the appropriate monitoring of the vibration cancellation system is illustrated in FIG. 2. The vibration cancellation system 25 is shown having the sensors 11 and actuator 12 and the synchronization source 18 connected thereto. The vibration cancellation data is illustrated in the first column as including input waveform which are available on lines 14 or 9 of FIG. 1, the input spectral waveform available on line 16, the transfer function available from processor 17 and given the number 17a, the output spectrum or spectral waveform available on line 19, and the output waveform available on lines 21 or 23 at the input or output of the output circuit.

Figure 8:
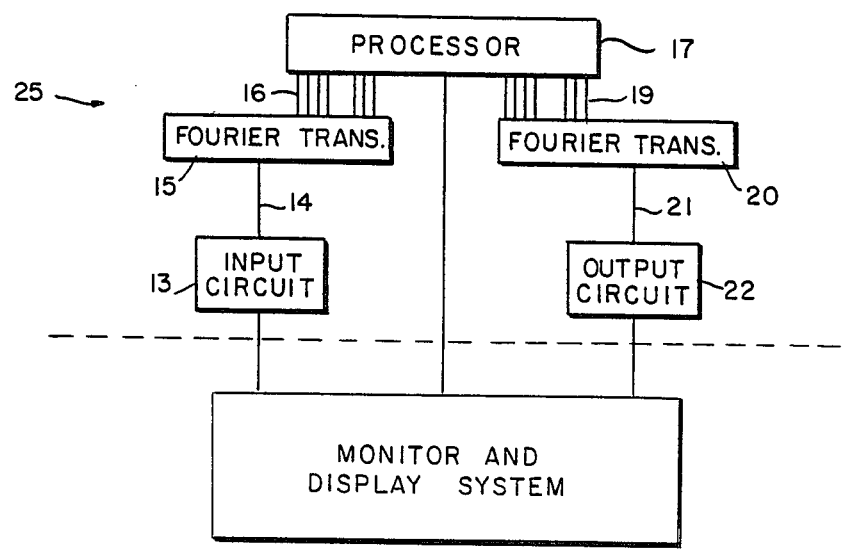
FIG. 8 is a schematic block diagram showing a vibration cancellation monitoring system not integral with vibration cancellation system constructed according to a preferred embodiment of the principal present invention.

Thus, the information is available in the prior art vibration cancellation system and need only to be processed further to provide an appropriate display. Where the monitoring and display system are not to be integral with the vibration cancellation system illustrated in FIG. 8, as well as in cases in which the vibration cancellation system does not calculate or provide the appropriate information, the monitoring and display system would have the ability to calculate and determine the appropriate information displayed. For example, the monitoring and display system would be connected to lines 9, 23 and the output from the synchronous input 18 so as to receive the same input and output signals of the vibration cancellation system. It would include the capability of taking these input and output signals and deriving the signal level data as well as converting both to spectral display information. From the input and output spectral display, the system could calculate the transfer function and appropriately display it. Thus, the same information can be provided as if the monitoring and display system were part of the vibration cancellation system, but would require additional circuitry or software. Information with respect to the synchronization signal to be described hereafter are also determined and provided in the display of the separate monitoring and display system. Also appropriate test signals can be provided by the stand-alone system.

The second column represents the vibration cancellation monitoring processors 30. This includes a level detector 31 and 35 for receiving the analog input waveforms on 14/9 and the output waveform on 21/23. A spectrum processor 32, 33 and 34 are for receiving respectively the input spectrum on 16, the transfer function on 17a and the output spectrum on 19 to provide an appropriate component of display. The vibration cancellation monitoring processors 30 produce the vibration cancellation monitor data 40 represented by the third column. This monitor data includes an input level display data 41 connected to level detector 31, an input spectrum display data 42 connected to the spectrum processor 32, a transfer function spectrum display data 43a and transfer function spectrum average magnitude display data 43b connected to spectrum processor 33, output spectrum display data 44 connected to spectrum display 34, and output level display data 45 connected to level detector 35. The output of the vibration cancellation monitored data are all connected to one or more display devices 50.

When a synchronous source 18 is used with vibration cancellation system 25, additional vibration cancellation monitor processors 30 and vibration cancellation monitor data 40 are provided. A rate detector 36 receives a synchronization signal and provides a sample rate display data 46. A period detector 37 also receives synchronization signal and provides as monitored data, the sample period display data 47a, the frequency unit display data 47b and the RPM display data 47c.

A group of control parameters 28 for the vibration cancellation system 25 may be controlled or selected by an operator input device 27. The control parameters which are provided to the vibration cancellation system 25 include the number of samples to be averaged 28a, the RPM multiplier 28b, the frequency limits 28c, the maximum output level 28d, the minimum input level 28e and the start RPM value 28f. A control parameter is provided to the display to control the display and includes a reference level 28g.

The number of samples to be averaged 28a is the number of cycles being averaged per sample. Although preferably, the system is designed to average two cycles per sample, this can be doubled up to 128 cycles per sample. The figure should be kept lower for maximum sensitivity. Each doubling will reduce the unsynchronized background noise by an additional six dB and will also increase the system's reaction time to changes in noise levels.

The RPM multiplier 28b, is the number of cycles of revolution that represents a single noise cycle. For example, in a four cycle engine, the noise cycle is every two cycles of revolution. The frequency limit 28c is the bandwidth. This sets an f-high and an f-low representing the highest and lowest frequencies which the system will process. Maximum output 28d and minimum input 28e set the levels of the input and output circuitry.

The start RPM 28f is the lowest RPM rate at which the vibration cancellation system 25 will operate. No cancellation will begin until the RPM increases above the start RPM rate and cancellation will stop when the RPM falls below this rate. This feature eliminates cancellation during unwanted start-up and shut-down periods.

The reference level 28g is the zero dB reference level for the noise spectrum graph. If the noise level causes the graph to go off the scale, the setting should be increased. It should be noted that this affects the display only and not the processing of the signals.

A typical example of the input and output information display is illustrated in FIG. 3. This provides a summary of the operation of each channel. The gain of the input channel is indicated in dBs and is set automatically by the vibration system 25. The input peak is the peak input level in dBs and the peak output is the peak output level produced by the vibration control system 25. The response ratio is the voltage change in the residual noise corresponding to one volt change by the vibration control system. This measures how well the environment is responding to changes made by the vibration control system. If the response ratio displayed is less than 0.5, there is amplification missing somewhere in the system and if this displayed ratio is over 15.0, there is overamplification in the system. The letter by the channel number could indicate the mode in which the system is operating, for example, normal, manual or test. The "L" indicates the input signal is too low for processing. This is normal when full quiet or cancellation has been achieved. If an H appears to the right of the peak number, it would indicate that the input signal is too high and is also not being processed.

Another display is illustrated in FIG. 4 is group information display. The input or output channels may be provided in appropriate groups including one or two channels and each group reflects the effects of the synchronization signal on the related group. As illustrated, the group display of FIG. 4 includes sample time, sample rate, frequency unit, RPM multiplier, RPM, and start RPM. All these are defined above.

The channel parameter display is illustrated in FIG. 5. This includes the channel number, mode of operation illustrated as "manual", number of cycles being averaged each cycle, high and low frequency to be processed, maximum output and minimum input, test type and display reference level. It should be noted that test type will be discussed more fully below.

An example of a spectrum display of a spectorial waveform is illustrated in FIG. 3. The selected frequencies of the display are listed in the first column on the left with the center frequency being listed in the last column on the right. For each frequency, the amplitude of that frequency within the input and output signals are listed. In the next three columns the magnitude, phase and coherence of the transfer function is provided.

Preferably, the vibration cancellation monitor processors 30, vibration cancellation monitoring data 40 and display devices 50 are integral with and contained in a single housing with the vibration cancellation system 25. Alternatively, the vibration cancellation monitor processors 30, vibration cancellation monitor data 40 and display device 50 may be connected to the vibration cancellation data and the vibration cancellation system 25 by communication link which may be hardwire or by a non-hardwire communication link. Similarly, the connection between the vibration cancellation monitor processor/vibration cancellation monitor data and the display devices 50 may be by communication link.

Figure 7:
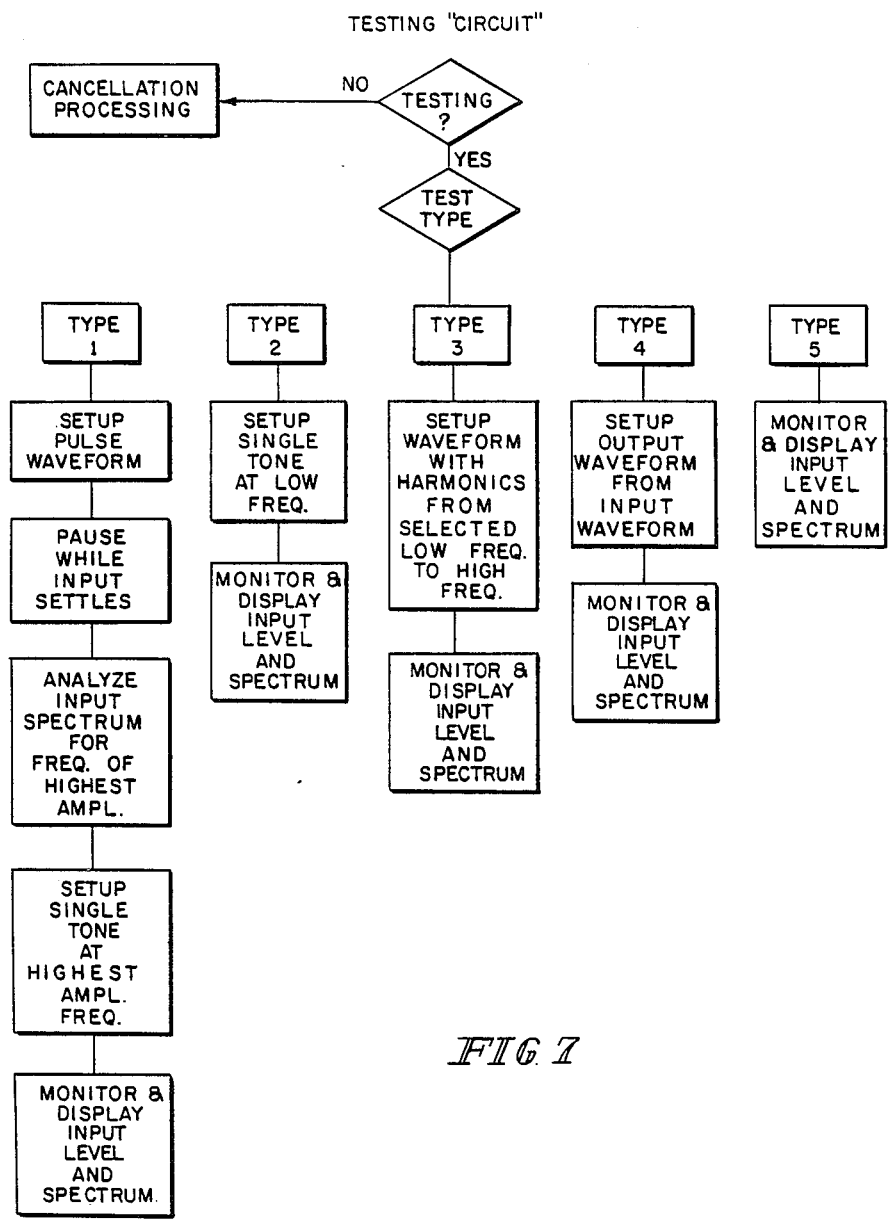
FIG. 7 is a flow diagram of the test modes to be used with the vibration cancellation and monitoring system of FIG. 2.

The vibration cancellation system testing circuit is illustrated in FIG. 7 by a software flow diagram performed by processor 17.

The five tests to be performed are as follows. Test 1 produces a pulse through the actuators 12 and the vibration cancellation system 25 determines the frequency at which the maximum input occurs. The vibration cancellation system 25 then produces a single tone at that frequency. If a tone is not heard using a speaker, or a vibration not felt when using a mechanical actuator, the gain setting of the power amplifiers in the output circuit 22 are adjusted. The input levels and spectrum are displayed.

The second test tests the output circuitry and produces an output signal of a single tone at the displayed low frequency. The input levels and spectrum are displayed. This second test tests for harmonic distortion. When the single tone is produced, a single tone should be detected by the input circuit. Thus, a plurality of output tones indicates the presence of harmonic distortion, generally in the speakers, or the vibration actuator.

A third test produces a variable harmonic pulsating output signal similar, for example, to the noise produced by a helicopter. This tests the system for a high noise environment with multiple harmonics. The input levels and spectrum are displayed.

The fourth test is a loop-back test wherein the signal applied to the channel input is bypassed unprocessed to the channel output. This bypasses the processor 17 by interconnecting fourier transformers 15 and 20. The input level and spectrum are displayed.

The fifth test produces no output and merely provides a display of the values of the signal present at the input sensor, which is an indication of the noisy environment before cancellation.

Whereas tests 1-4 are performed without a noisy environment, and thus are a test of the system, the fifth test is usually performed in the noisy environment.

The present system provides a way of monitoring failure of the system which produces the vibration. For example, the fifth test will allow monitoring of the input signal to determine whether it has increased abnormally when cancellation is not in effect. Also, the cancellation output signal can be monitored to determine whether it has increased abnormally. A further indication of failure would be an abnormal change in the RPMs received from the synchronization signal source. Abnormal change in the input and output spectrums, as well as the transfer function, are indications of a defective system. The determination of abnormality can be from historical records of the environment or system to be monitored, or from knowledge of the proper functioning of the equipment being monitored. Similarly, the processor 17 can be provided with a sufficient memory storage to provide its own historical data with certain limits on what would constitute an abnormal change from previous sample periods.

Although the present invention has been described and illustrated in detail, it is to be clearly understood that the same is by way of illustration and example only, nd is not to be taken by way of limitation. The spirit and scope of the present invention are to be limited only by the terms of the appended claims.

What is claimed:

1. Vibration cancellation and monitoring system comprising:
    input means for receiving sensed vibration signals from vibration sensors and generating input vibration signals;
    output means for receiving output vibration signals and generating a vibration cancellation actuator signal for a vibration actuator;
    transfer means for deriving a transfer function from said input vibration signals from said input means and generating output vibration signals for said output means as a function of said transfer function; and
    display means for displaying more than one of the following: said input vibration signals, said transfer function and said output vibration signals.

2. Vibration cancellation and monitoring system according to claim 1, wherein:
    said input means includes first means for generating an input signal waveform from said sensed vibration signals and second means for generating an input spectral waveform from said input signal waveform;
    said transfer means derives a transfer function from said input spectral waveform and generates an output spectral waveform;
    said output means generates a vibration cancellation actuator signal from said output spectral waveform; and
    said display means displays at least one of the following: said input signal waveform, said input spectral waveform, said transfer function, said vibration cancellation actuator signal and said output spectral waveform.

3. Vibration cancellation and monitoring system according to claim 2, wherein said input and output means each include a peak detector means for determining a peak of a respective input and output vibration signal and said display means displays input and output peaks.

4. Vibration cancellation and monitoring system according to claim 3, wherein said input means includes self-adjusting input gain means and said display means displays input gain.

5. Vibration cancellation and monitoring system according to claim 2, wherein said transfer means includes means for generating a transfer function spectral waveform and means for determining average magnitude of said transfer function, and said display means displays said transfer function spectral waveform and said average magnitude.

6. Vibration cancellation and monitoring system comprising:
    input means for receiving sensed vibration signals from vibration sensors and generating input vibration signals;
    input peak detector means for determining a peak of said input vibration signal;
    output means for receiving output vibration signals and generating a vibration cancellation actuator signal for a vibration actuator;
    output peak detector means for determining a peak of said output vibration signal;
    transfer means for deriving a transfer function from said input vibration signals from said input means and generating output vibration signals for said output means as a function of said transfer function; and
    display means for displaying more than one of the following: said input vibration signals, said input peak, said transfer function, said output vibration signals and said output peak.

7. Vibration cancellation and monitoring system according to claim 6, wherein said input means includes self-adjusting input gain means and said display means displays input gain.

8. Vibration cancellation and monitoring system according to claim 6, wherein said transfer means includes means for setting maximum output signal and minimum input signal, and said display means displays said set maximum output signal and set minimum input signal.

9. Vibration cancellation and monitoring system comprising:
- input means for receiving sensed vibration signals from vibration sensors and generating input vibration signals;
- output means for receiving output vibration signals and generating a vibration cancellation actuator signal for a vibration actuator;
- transfer means for deriving a transfer function from said input vibration signals from said input means and generating output vibration signals for said output means as a function of said transfer function;
- means for generating a transfer function spectral waveform;
- means for determining average magnitude of said transfer function; and
- display means for displaying more than one of the following: said input vibration signals, said transfer function, said transfer function spectral waveform, said transfer function average magnitude, and said output vibration signals.

10. Vibration cancellation and monitoring system according to claim 9, wherein said transfer means includes means for setting highest and lowest frequencies of input signals to be processed, and said display means displays said set highest and lowest frequencies.

11. Vibration cancellation and monitoring system according to claim 9, wherein said display means includes means for setting the zero reference level for spectral waveform display and displays said zero reference level.

12. Vibration cancellation and monitoring system comprising:
- input means for receiving sensed vibration signals from vibration sensors and generating input vibration signals;
- output means for receiving output vibration signals and generating a vibration cancellation actuator signal for a vibration actuator;
- transfer means for deriving a transfer function from said input vibration signals from said input means and generating output vibration signals for said output means as a function of said transfer function;
- sync means for receiving a synchronization signal;
- rate detector means for detecting a sample rate from said synchronization signal;
- period detector means for detecting a sample period from said synchronization signal; and
- display means for displaying more than one of the following: said input vibration signals, said transfer function, said output vibration signals, said sample rate and said sample period.

13. Vibration cancellation and monitoring system according to claim 12, including means for determining the revolutions per minute of said synchronization signal and said display means displays revolution per minute of said synchronization signal.

14. Vibration cancellation and monitoring system according to claim 13, wherein said transfer means includes enabling means for enabling said transfer means at synchronization signals above a minimum revolutions per minute, means for selecting said minimum revolutions per minute and said display means displays said selected minimum revolutions per minute.

15. Vibration cancellation and monitoring system comprising:
- input means for receiving sensed vibration signals from vibration sensors and generating input vibration signals;
- output means for receiving output vibration signals and generating a vibration cancellation actuator signal for a vibration actuator;
- transfer means for deriving a transfer function from said input vibration signals from said input means and generating output vibration signals for said output means as a function of said transfer function;
- conversion means for converting input vibration signals, transfer function and output vibration signals from vibration cancellation format to display format; and
- display means for displaying more than one of the following: said input vibration signals, said transfer function and said output vibration signals.

16. Vibration cancellation and monitoring system according to claim 15, wherein said display means is in a common housing with said input means, output means and transfer means.

17. Vibration cancellation and monitoring system according to claim 15, wherein said display means is separate from a housing common to said input means, output means and transfer means and is connected thereto by a communication link.

18. Vibration cancellation and monitoring system according to claim 1, wherein said transfer means includes parameter means for defining operating parameters of said transfer means, and keyboard means for entering operating parameters into said parameter means and said display means displaying said operating parameters.

19. Vibration cancellation and monitoring system according to claim 18, including test means for generating a test signal to test response of said vibration cancellation system.

20. Vibration cancellation and monitoring system comprising:
- input means for receiving sensed vibration signals from vibration sensors and generating input vibration signals;
- output means for receiving output vibration signals and generating a vibration cancellation actuator signal for a vibration actuator;
- transfer means for deriving a transfer function from said input vibration signals from said input means and generating output vibration signals for said output means as a function of said transfer function;
- display means for displaying at least one of the following: said input vibration signals, said transfer function and said output vibration signals; and
- test means for producing an output pulse, determining the frequency at which maximum input occurs in response to said output pulse and providing a single tone output pulse at said frequency.

21. Vibration cancellation and monitoring system comprising:
- input means for receiving sensed vibration signals from vibration sensors and generating input vibration signals;
- output means for receiving output vibration signals and generating a vibration cancellation actuator signal for a vibration actuator;
- transfer means for deriving a transfer function from said input vibration signals from said input means and generating output vibration signals for said output means as a function of said transfer function;

display means for displaying at least one of the following: said input vibration signals, said transfer function and said output vibration signals;
means for setting the lowest frequency of input signals to be processed by said transfer means; and
test means for producing a single tone output signal at said set lowest frequency.

22. Vibration cancellation and monitoring system comprising:
input means for receiving sensed vibration signals from vibration sensors and generating input vibration signals;
output means for receiving output vibration signals and generating a vibration cancellation actuator signal for a vibration actuator;
transfer means for deriving a transfer function from said input vibration signals from said input means and generating output vibration signals for said output means as a function of said transfer function;
display means for displaying at least one of the following: said input vibration signals, said transfer function and said output vibration signals; and
test means for producing a variable harmonic pulsating output signal.

23. Vibration cancellation and monitoring system comprising:
input means for receiving sensed vibration signals from vibration sensors and generating input vibration signals;
output means for receiving output vibration signals and generating a vibration cancellation actuator signal for a vibration actuator;
transfer means for deriving a transfer function from said input vibrations signals from said input means and generating output vibrations signals for said output means as a function of said transfer function;
display means for displaying at least one of the following: said input vibration signals, said transfer function and said output vibration signals; and
test means for providing said input vibration signals to said output means bypassing said transfer means.

24. Vibration cancellation and monitoring system according to claim 1, including test means for disabling said output means.

25. Monitoring and testing system for a separate vibration cancellation system having first input means for receiving sensed vibration signals from vibration sensors and generating input vibration signals; first output means for receiving output vibration signals and generating a vibration cancellation actuator signal for a vibration actuator; and transfer means for generating output vibration signals for said output means as a function of a transfer function; said monitoring and testing system includes:
second input means to be connected to said first input means;
second output means to be connected to said first output means;
testing means for providing a test actuator signal to said second output means; and
display means for displaying input vibration signals from said second input means.

26. A monitoring and testing system according to claim 25, wherein said testing means includes first testing means for producing an output pulse, determining the frequency at which maximum input occurs in response to said output pulse and providing a single tone output pulse at said frequency.

27. A monitoring, and testing system according to claim 25, including means for setting the lowest frequency of input signals to be processed by said transfer means and said testing means includes second test means for producing a single tone output signal at said set lowest frequency.

28. A monitoring, and testing system according to claim 25, wherein said testing means includes a third test means for producing a variable harmonic pulsating output signal.

29. A monitoring, and testing system according to claim 25, wherein said testing means includes a fourth test means for providing said input vibration signals to said second output means.

30. A monitoring, and testing system according to claim 25, wherein said testing means includes fifth test means for disabling said second output means.

31. A monitoring, and testing system according to claim 25, including first spectral means for generating an input spectral waveform from signals at said second input means; and wherein said display means displays said input spectral waveform.

32. A monitoring, and testing system according to claim 31, including output spectral means for generating spectral waveforms from signals of said second output means; and wherein said display means displays vibration cancellation actuator signals and output spectral waveforms.

33. A monitoring, and testing system according to claim 32, including means for determining a transfer function from signals at said second input and output means; and wherein said display means displays said transfer function.

34. A vibration cancellation monitoring system for a vibration cancellation system having first input means for receiving sensed vibration signals from vibration sensors and generating input vibration signals; first output means for receiving output vibration signals and generating a vibration cancellation actuator signal for a vibration actuator; and transfer means for generating output vibration signals for said first output means as a function of a transfer function; said monitoring system comprising:
second input means to be connected to said first input means;
third input means to be connected to said first output means;
first spectral means for generating an input spectral waveform from signals at said second input means;
second spectral means for generating an output spectral waveform from signals at said third input means; and
display means for displaying signals at said second and third input means and input and output spectral waveforms.

35. A vibration cancellation monitoring system according to claim 34, including means for determining a transfer function from signals at said second and third input means; and wherein said display means displays said transfer function.

* * * * *